United States Patent [19]

Kreiskorte

[11] 4,227,450
[45] Oct. 14, 1980

[54] PRESS WITH SMALL RAM STROKE

[75] Inventor: Heinz Kreiskorte, Dortmund, Fed. Rep. of Germany

[73] Assignee: Thyssen Industrie AG, Fed. Rep. of Germany

[21] Appl. No.: 8,515

[22] Filed: Feb. 1, 1979

[30] Foreign Application Priority Data

Feb. 6, 1978 [DE] Fed. Rep. of Germany ...... 2805013

[51] Int. Cl.³ .......................................... B30B 15/04
[52] U.S. Cl. .................................. 100/214; 83/588; 100/231; 100/266; 100/295
[58] Field of Search .............. 100/214, 268, 281, 231, 100/266, 295; 83/588

[56] References Cited

U.S. PATENT DOCUMENTS 2,466,907  4/1949  Nadolny ........................ 100/266 X

*Primary Examiner*—Billy J. Wilhite
*Attorney, Agent, or Firm*—McGlew & Tuttle

[57] ABSTRACT

A press which has a short ram stroke in which the ram is movable in a single plane in a working direction and return direction, particularly for high speed cutting presses, comprises, a press frame with a ram carried by the press frame which is supported by springs which are rigidly connected to the ram and to the press frame and hold the ram resiliently for movement in the working and return direction but rigidly in all other planes. The springs advantageously comprise at least two spring elements which are arranged substantially perpendicular to the direction of the ram stroke and may advantageously comprise sets of bar springs arranged on each of two sides of the ram and connected from the ram to the frame; leaf springs having lateral extensions which are arranged one above the other and connected between the ram and the frame or springs arranged in a network or pattern in the form of spiral spring assemblies or spring packs which permit the displacement of the ram in the working and return stroke but hold it rigidly in other planes.

10 Claims, 5 Drawing Figures

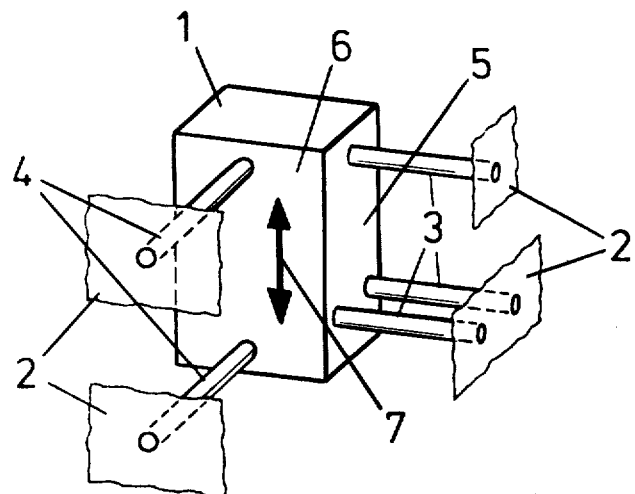
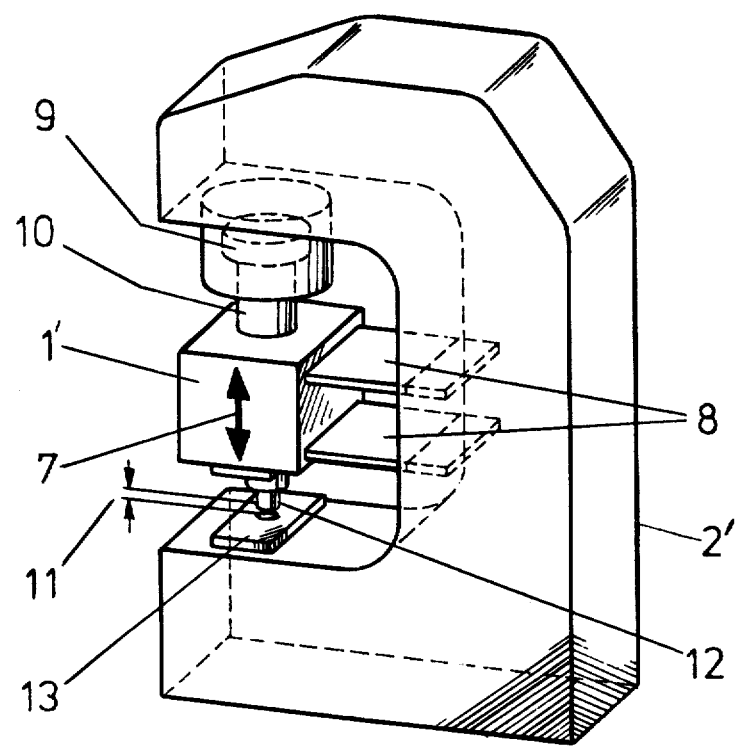

PRESS WITH SMALL RAM STROKE

FIELD AND BACKGROUND OF THE INVENTION

This invention relates to the construction of presses in general and in particular, to a new and useful press having a small ram stroke in which the ram is supported from the press frame by springs which hold the ram resiliently for movement in a working and return direction, but rigidly in respect to all other planes.

DESCRIPTION OF THE PRIOR ART

In the known presses, guidance of the ram frequently presents problems because both the ram and the top tool secured thereon are also subject to lateral movements relative to the bottom, due to unavoidable play, and such movements not only influence the size of the effective gap, but they also cause relatively great wear of the tools and of the ram guide. These problems are particularly great in high speed presses, particularly in cutting presses which are used, for example, in stamping rotor and stator laminations for electrical machines. In order to keep the ram play and, thus, the possible lateral movements of the top tool at a minimum, it is customary to guide the ram by means of multi-track, prestressed roller guides. Apart from the fact that lateral play cannot be completely avoided with these ram guides, their manufacture is very elaborate, time-consuming and expensive, since both the guideways on the ram and the roller tracks on the press frame must be carefully ground, and only rollers with extremely narrow manufacturing tolerances can be used. In addition, it is necessary to lubricate the roller guides constantly with an elaborate lubricating system, in order to keep the friction between the guideways and the rollers at a minimum.

SUMMARY OF THE INVENTION

The present invention is based on the problem of designing a press with a small ram stroke in such a manner that the ram guide avoids the above-mentioned drawbacks and is thus free of wear. Lateral movements of the top tool connected with the ram are avoided to a great extent or they are possible with only extremely narrow tolerances.

In accordance with the invention, the ram is connected with the press frame by at least two spring elements which are arranged substantially perpendicularly to the ram stroke and are resilient in the direction of motion of the ram, while they are substantially rigid in all other planes. The spring elements are held clamped at their respective ends on the ram and on the press frame.

With a press according to the invention, wear of the ram guide is not possible, since the ram is guided by the spring elements which act as guide rods, and, therefore, neither sliding or rolling friction appear between the frame and the ram. The spring elements do not hinder the movements of the ram in the working direction and return, while free lateral or rotary movements of the ram are impossible. In this way, wearing of the tools is also considerably reduced.

In the simplest form, the spring elements are designed as straight bar springs, and two of these bar springs are arranged in spaced locations, one above the other, and are secured on the ram and on the frame. This design is advantageously a simple design, with a very rugged structure, particularly in high speed cutting presses with a very small ram stroke, and provides the additional advantage that any frictional wear is impossible. Although the ram is deflected in such a design during the working and return strokes by the bar springs in one plane relative to the straight feed axis, since the fastening points of the spiral springs acting as guide rods, which are located on the ram, perform curved movements during the strokes, these deflections, whose size depends on the length of the springs and on the stroke of the ram, are extremely small. The longer the springs, the smaller are the deflections of the ram from the feed axis or out of the axis of advance. With relatively long springs and with only a few millimeters of ram strokes, the deflections are, in practice, on the order of a few thousandths of a millimeter, relative to the small thicknesses of the sheets to be cut.

In some cases, it is advisable to combine the springs, at least in pairs, to spring packs, since great advantages can be achieved in the manufacture and in costs, with good results.

In another embodiment of the invention, at least two parallel spring elements, in the form of straight springs, which are slightly inclined relative to the ram and are distributed over the length of the ram, are arranged additionally on the side of the ram facing the tool, whose ends remote of the ram are clamped in a thrust plate which is connected at the other end with the press frame by additional parallel spiral springs extending in opposite directions to the first-mentioned springs. The spring which is clamped in the thrust plate, as seen in a side view, is arranged in herringbone fashion. The thrust plate is connected with the ram drive and acts transverse to the direction of motion of the ram drive and transverse to the direction of motion of the ram, due to its connection by a tension and compression member preferably arranged in its longitudinal axis and which yields in the direction of motion of the ram. As a tension and compression member can be used, either an all-rigid bar secured with known joints, or a spring which is rigidly connected with the thrust plate and the ram drive, and which, due to its spring properties, is a bar with ideal joints. It is sufficient to arrange the spring elements supporting the ram directly against the frame and extending transverse to the direction of motion of the ram only in one plane, since tilting movements of the ram are already prevented by the abovementioned springs arranged in a herringbone fashion. In such a press, the ram is thus guided by spring elements which support the ram against the frame in one of the ways described above, on the one hand, and, on the other hand, the ram is also driven over spring elements designed as springs and, hence, not directly. This design of the invention offers the possibility of using a friction-free ram guide in both vertical and horizontal presses in an advantageous manner. In addition, the ram drive for vertical ram movements is arranged horizontally, so that the overall height of the press is considerably reduced relative to presses with the drive arranged above the ram, and is thus space-saving. Another advantage is that the arrangement of the spiral springs inclined in an opposite direction and secured on the thrust plate, leads to a sort of spreading or wedge effect of the thrust plate with the spring elements, by which a transmission of the driving force is achieved. In addition, this design produces a favorable stress on the ram by the distribution of the driving force over the back of the ram.

Naturally, it is irrelevant for the invention whether the spring elements consist of metal, glass fiber-reinforced plastic or any other suitable spring material. Although leaf springs with a rectangular cross-section are preferable for the spiral springs in most cases because of their great lateral rigidity, spring elements with a different cross-sectional form, e.g., round spring bars, can be used in some cases with advantage as a ram guide, particularly, if two or more spring elements are arranged side-by-side in one plane.

Accordingly, an object of the present invention is to provide a press having a short ram stroke in which the ram is movable in a single plane in a working direction and a return direction and particularly for high speed cutting presses, which comprises a press frame with a ram being carried by the press frame and spring means rigidly connected to the ram and the press frame and holding the ram resiliently for movement in the working direction and return direction but rigidly in all other planes.

A further object of the invention is to provide a press with a small ram stroke which is simple in design, rugged in construction and economical to manufacture.

The various features of novelty which characterize the invention are pointed out with particularity in the claims annexed to and forming a part of this disclosure. For a better unerstanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the Drawings:

FIG. 1 is a schematic perspective view of a press constructed in accordance with the invention;

FIG. 2 is a view similar to FIG. 1 showing a further view of the frame and of another embodiment of the invention;

DESCRIPTION OF THE PREFERRED EMBODIMENTS

Figure 3:
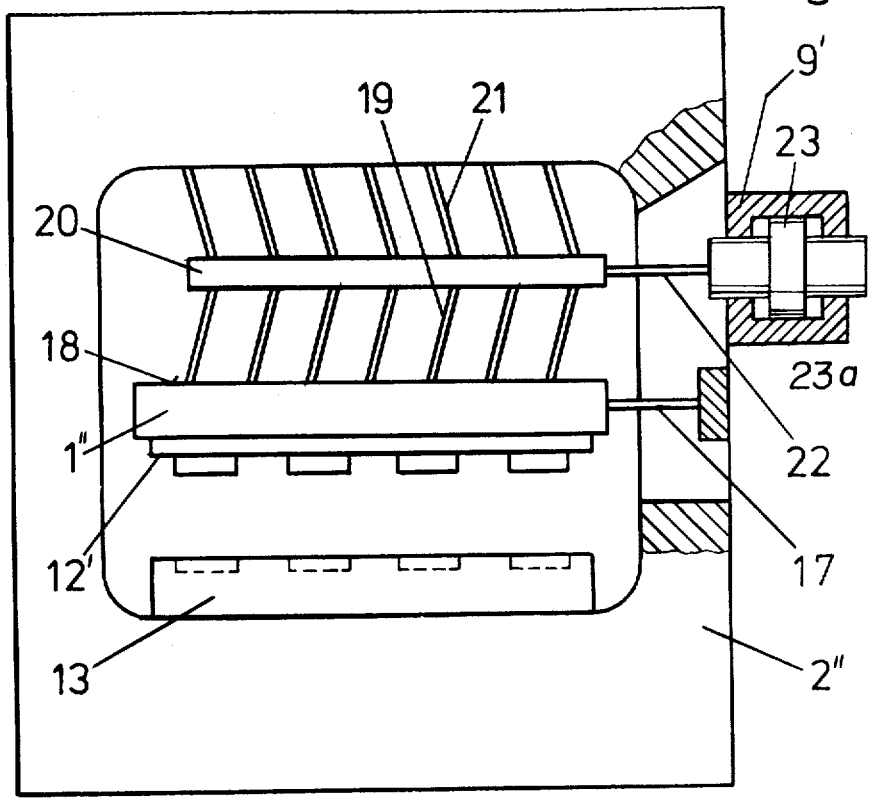
FIG. 3 is a side elevational view of a press frame of another embodiment of the invention.

Referring to the drawings in particular, the invention embodied therein, comprises a press frame 2, with a ram 1 carried by the frame and which is supported by spring means 3, 4 for movement in a single plane in the working and return directions as indicated by the double arrows 7 but held rigidly in respect to all other planes.

As shown schematically in FIG. 1, ram 1 is connected with the frame 2, of which only small sections are shown with five spring elements which serve to guide ram 1 and which are designed as round bar springs 3 and 4. Three bar springs 3, namely, two on a horizontal plane arranged side-by-side in spaced relationship are arranged on a first side 5 of ram 1 and the third spring is arranged on the mid-perpendicular of and above this plane. Two additional bar springs 4 are arranged on a second side 6 of ram 1, which is in a right angle to its side 5, in a vertical plane spaced one above the other. The springs 3 and 4 may have round, rectangular or other cross section. Due to this arrangement of the round bar springs 3 and 4, ram 1 can yield up and down in the direction of ram stroke 7, while it is substantially rigid in planes perpendicular to ram stroke 7 and against rotary and tilting movements.

In the embodiment of FIG. 2, ram 1' of a high speed cutting press is held and guided on press frame 2' by means of two springs 8, designed as leaf springs. The springs 8 are arranged on one side of ram 1' and are spaced one above the other, and are clamped horizontally in ram 1' and in frame 2'. This arrangement and design of sprial springs 8 permits unhindered ram movements in the direction of ram stroke 7, while ram movements perpendicular to ram stroke 7 and rotary and tilting movements of the ram are not possible or are negligibly small. Ram drive 9 comprises a hydraulic cylinder piston unit in a known manner, whose piston rod 10 is connected with the ram 1'. The distance 11 between a top tool 12, secured on the underside of ram 1', and a bottom tool 13 secured on frame 2' is only a few millimeters.

Figure 4:
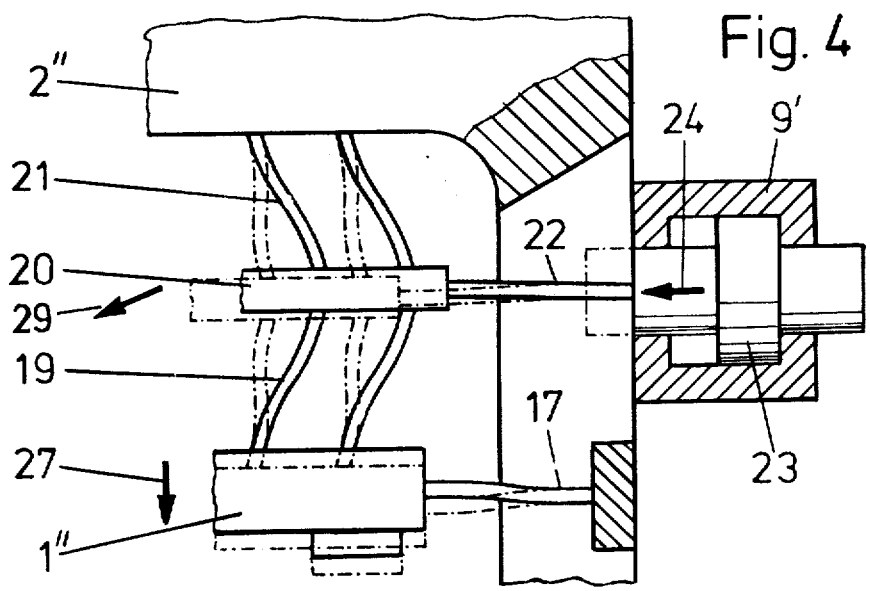
FIG. 4 is a partial view of the frame shown in FIG. 3.

In one embodiment of FIGS. 3 and 4, a ram 1" is guided relative to frame 2" by horizontally arranged springs 17, designed as rectangular leaf springs, which are arranged in tandem. A row of parallel springs 19 are arranged on side 18 of ram 1 remote of a top tool 12'. The springs are slightly inclined relative to ram 1" and are evenly distributed over the length of the ram. With an irregular distribution of the force, a different arrangement of the springs may be even more advantageous. The ends of springs 19, remote of ram 1", are clamped in a thrust plate 20, which is connected at the other end with a press frame 2" by additional parallel springs 21 extending in opposite directions to springs 19. In this side elevation, the springs 19 and 21 are arranged in herringbone fashion.

Thrust plate 20 is connected with the piston rod 23a of piston 23 of ram drive 9' by means of a tension and compression member 22 arranged in its longitudinal axis, which consists of a spring yielding in the direction of motion of the ram. When the piston of ram drive 19 is moved in the direction of arrow 24, springs 19 and 21 are guided into the position indicated by broken lines, and are bent slightly in S-form, so that thrust plate 20 moves in the direction of arrow 29, and ram 1" performs a vertical working stroke in the direction of arrow 27, see FIG. 4. Accordingly, ram 1", thrust plate 20 and spiral springs 19 and 21 again assume their starting position, indicated by solid lines, by relieving and withdrawing piston 23.

Figure 5:
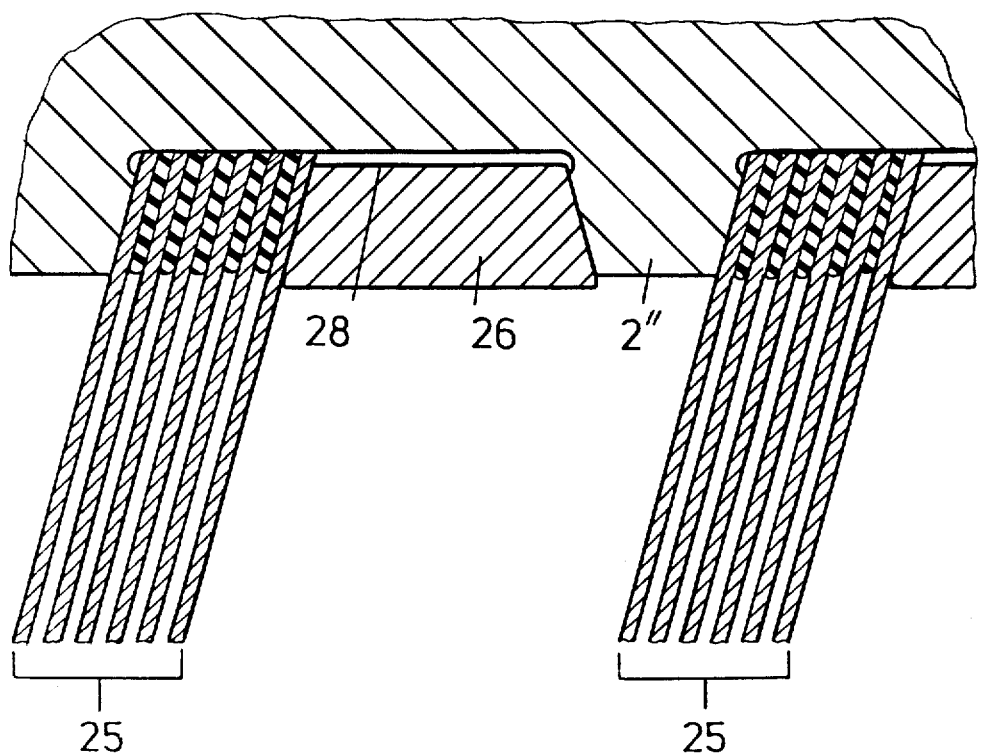
FIG. 5 is a view of a frame similar to FIG. 3 but indicating another means for constructing and mounting the spring packs.

According to FIG. 5, it is possible, as well as advantageous for the assembly of the press to combine the springs to spring packs 25, and to clamp them with wedge clamps 26 in recesses 28 of frame 2". In this embodiment, the spring packs are clamped in the same manner in the ram, which has not been shown.

While specific embodiments of the invention have been shown and described in detail to illustrate the application of the principles of the invention, it will be understood that the invention may be embodied otherwise without departing from such principles.

What is claimed is:

1. A press having a short ram stroke in which the ram is movable in a single plane in a working direction and in a return direction and particularly for high speed cutting presses, comprising, a press frame, a ram carried by said press frame, spring elements having ends rigidly connected to said ram and to said press frame and holding said ram resiliently from said frame for movement in a working direction and return direction but holding said ram rigidly in all other planes, said spring elements comprising at least two spaced apart spring members connected between said ram and said frame and disposed substantially perpendicular to the direction of the working and return directions of movement of said ram.

2. A press having a short ram stroke in which the ram is movable in a single plane in a working direction and in a return direction and particularly for high speed cutting presses, comprising, a press frame, a ram carried by said press frame, spring elements having ends rigidly connected to said ram and to said press frame and holding said ram resiliently from said frame for movement in a working direction and return direction but holding said ram rigidly in all other planes, said spring elements comprising at least two springs arranged in spaced relationship, one above the other.

3. A press having a short ram stroke in which the ram is movable in a single plane in a working direction and in a return direction and particularly for high speed cutting presses, comprising, a press frame, a ram carried by said press frame, spring elements having ends rigidly connected to said ram and to said press frame and holding said ram resiliently from said frame for movement in a working direction and return direction but holding said ram rigidly in all other planes, said spring elements comprising a horizontally extending thrust plate and a plurality of springs interconnecting said thrust plate and said press frame above said thrust plate and said ram below said thrust plate and means connected to said ram to drive said ram including a fluid pressure operated piston and cylinder combination and a thrust and compression member connected between said piston and cylinder combination and said thrust plate to displace said thrust plate and thereby cause said ram to move in a working direction.

4. A press having a short ram stroke in which the ram is movable in a single plane in a working direction and in a return direction and particularly for high speed cutting presses, comprising, a press frame, a ram carried by said press frame, spring elements having ends rigidly connected to said ram and to said press frame and holding said ram resiliently from said frame for movement in a working direction and return direction but holding said ram rigidly in all other planes, said spring elements comprise two bar springs arranged in spaced relationship one above the other and connected to one side of said ram and to said press frame, and at least two additional bar springs arranged in spaced vertical relationship and connected to another side of said ram perpendicular to said first mentioned bar springs.

5. A press having a short ram stroke in which the ram is movable in a single plane in a working direction and in a return direction and particularly for high speed cutting presses, comprising, a press frame, a ram carried by said press frame, spring elements having ends rigidly connected to said ram and to said press frame and holding said ram resiliently from said frame for movement in a working direction and return direction but holding said ram rigidly in all other planes, said spring elements comprising first and second flat, vertically spaced leaf springs connected between said ram and said press frame.

6. A press having a short ram stroke in which the ram is movable in a single plane in a working direction and in a return direction and particularly for high speed cutting presses, comprising, a press frame, a ram carried by said press frame, spring elements having ends rigidly connected to said ram and to said press frame and holding said ram resiliently from said frame for movement in a working direction and return direction but holding said ram rigidly in all other planes, said spring elements comprising a spring support frame connected between the top of said ram and said press frame, and a plurality of vertically spaced horizontally arranged springs connected between a side of said ram and said support frame.

7. A press having a short ram stroke in which the ram is movable in a single plane in a working direction and in a return direction and particularly for high speed cutting presses, comprising, a press frame, spring elements having an end rigidly connected to said press frame, a ram rigidly connected to another end of said spring elements and resiliently supported solely by said spring elements from said frame for movement in a working direction and return direction such that said spring elements guide said ram relative to said frame while holding said ram rigidly in all other planes.

8. A press, as claimed in claim 7, wherein said spring elements comprises bar spring elements.

9. A press, as claimed in claim 7, wherein said spring elements comprise a plurality of spaced apart springs arranged in pairs and forming spring packs.

10. A press, as claimed in claim 7, wherein said spring elements comprise a plurality of spring packs.

* * * * *